United States Patent [19]
Rigney et al.

[11] 3,826,321
[45] July 30, 1974

[54] LOAD WEIGHING SYSTEM FOR CRANES WITH ROTATABLE BOOMS

[75] Inventors: Edward T. Rigney, Wayland; Richard A. Benson, Bedford; Bradford W. Edgerton, Lynnfield, all of Mass.

[73] Assignee: Trans-Sonics, Inc., Lexington, Mass.

[22] Filed: May 25, 1973

[21] Appl. No.: 363,942

[52] U.S. Cl............... 177/210, 177/145, 177/147, 340/267 C, 235/151.33
[51] Int. Cl............................................ G01g 19/18
[58] Field of Search............. 177/145, 147, 210–11; 73/141, 143; 235/151.33; 212/39, 40; 340/267 C, 282

[56] References Cited
UNITED STATES PATENTS

| | | | |
|---|---|---|---|
| 3,095,057 | 6/1963 | Krapeline | 177/147 |
| 3,244,243 | 4/1969 | Fielder | 177/147 X |
| 3,323,606 | 6/1967 | Bruns et al | 177/147 |
| 3,505,514 | 4/1970 | Fathauer | 235/151.33 X |
| 3,540,271 | 11/1970 | Hoff | 177/147 X |
| 3,566,386 | 2/1971 | Hamilton | 340/267 C |
| 3,610,342 | 10/1971 | Sfainken | 177/147 |
| 3,631,537 | 12/1971 | Zibolski et al. | 340/267 C |
| 3,638,212 | 1/1972 | Peter et al. | 340/267 C |

Primary Examiner—Richard B. Wilkinson
Assistant Examiner—Vit W. Miska
Attorney, Agent, or Firm—Cesari and McKenna

[57] ABSTRACT

A load weighing system for a crane having a boom which is independently rotatable with respect to an operator's cab carrying an indicator for displaying the load weight. The system uses a boom-mounted dynamometer whose output is an accurate indication of cable tension and therefore load weight. The dynamometer output modulates a transmitter and the transmitter output is fed to a loop around the boom pedestal. The resulting magnetic field surrounding the loop provides a medium for coupling the transmitted signal to the cab-mounted receiver.

20 Claims, 6 Drawing Figures

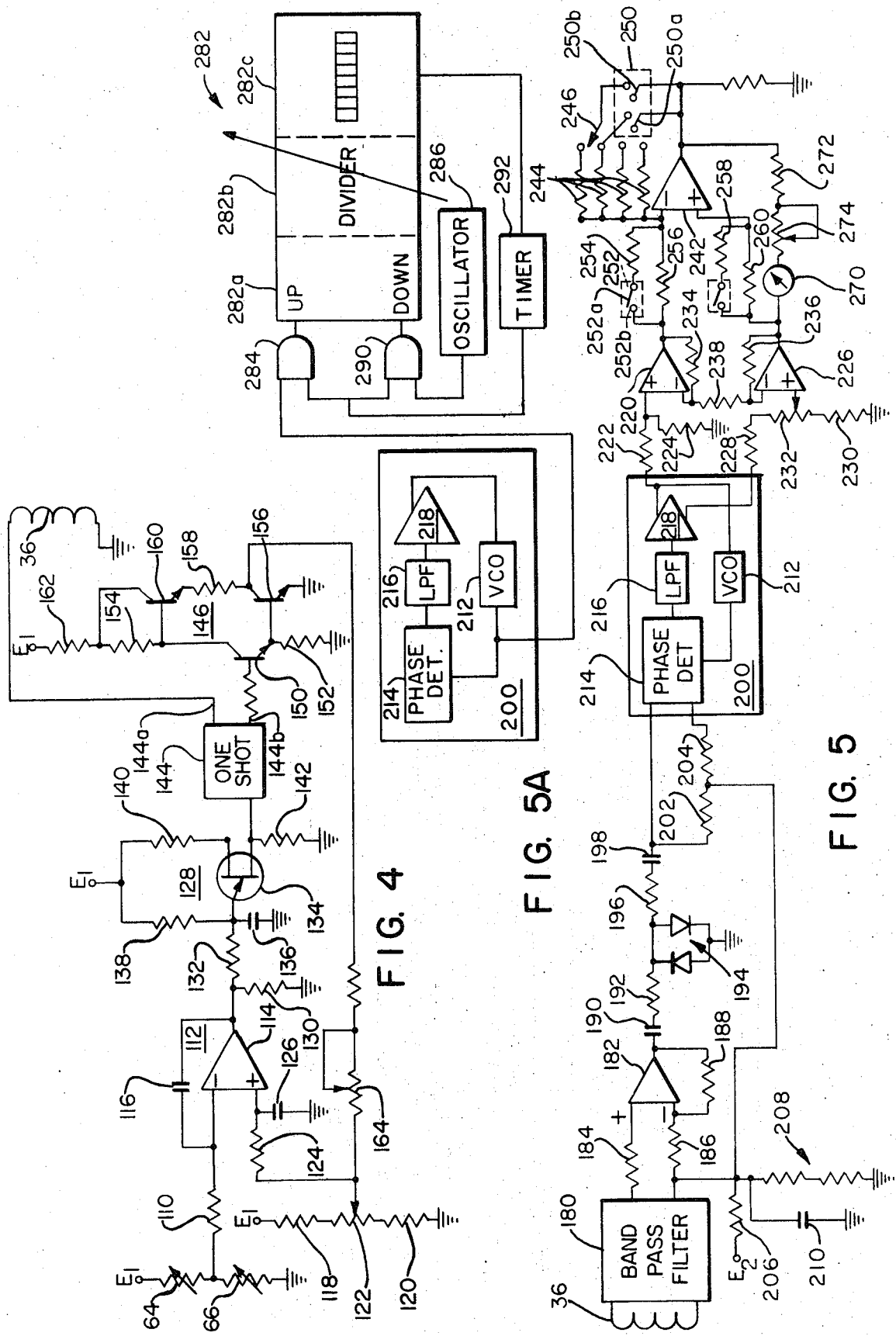

3,826,321

LOAD WEIGHING SYSTEM FOR CRANES WITH ROTATABLE BOOMS

BACKGROUND OF THE INVENTION

1. Field of the Invention

The invention relates to weighing systems and, more particularly, to electronic load weighing systems for cranes.

2. Prior Art

In using cranes, it is desirable, and frequently necessary, to obtain measurement of the weight of the load being lifted so that the safe operating limits of the crane are not exceeded. This is especially so with cranes having booms, since excess loads may exceed the bending moment of the boom and thereby break it or cause the base to topple if it is not anchored to ground.

Many different types of measuring devices have heretofore been proposed for such purposes. One such device is described in U.S. Pat. application Ser. No. 258,079 filed May 30, 1972 by Edward T. Rigney, et al. The weighing system there shown incorporates a sensor mounted at the load end of the cable and uses the lifting cable and boom as a transmission line for transmitting the signal from the sensor to a remote indicator in the crane operator's cab or elsewhere. A system of this type possesses a number of advantages. However, it requires a continuous conductive connection between the sensor and the remote transmitter, and thus is not well adapted for use in cranes in which the cable (and the boom assembly which supports it) is capable of unrestricted rotation independent of the operator's cab where the remote indicator is typically positioned.

Transmitters which broadcast a radio frequency signal from the sensor to a remote receiver have also been proposed for such purposes, but are subject to false weight indications caused by interference picked up from other radio frequency transmitters in the area.

Dynamometers have also heretofore been employed in sensing the weight of a load in a line. These instruments operate by sensing the tension in a cable lifting the load; this tension is, of course, directly related to the weight of the load being lifted. It is frequently difficult to obtain an accurate yet rugged dynamometer at reasonable cost for use in systems which must lift a substantial weight.

BRIEF DESCRIPTION OF THE INVENTION

Objects of the Invention

Accordingly, it is an object of the invention to provide an improved load weighing system for cranes.

Further, it is an object of the invention to provide an improved load weighing system for cranes having booms freely rotatable independently of an operator's cab in which a remote load indicator is mounted.

A further object of the invention is to provide a load-weighing system which is relatively insensitive to stray electrical radiation and other types of noise.

Yet another object of the invention is to provide an improved dynamometer for use with a crane load weighing system.

Another object of the invention is to provide a simple, improved, inexpensive but accurate dynamometer for use in a crane load weighing system.

Summary of the Invention

The present invention will be described with particular reference to a crane having an operator's cab fixed to a body and a boom freely rotatable with respect to the body. A dynamometer is mounted on the boom for sensing the tension in the lifting cable. The dynamometer has a strain gage transducer which provides modulating input to a transmitter also mounted on the boom. The transmitter generates a frequency modulated pulse train and applies this to a coil which is physically mounted on the boom and which encircles a pedestal on which the rotatable boom is mounted. An antenna is positioned on the stationary body closely adjacent the coil and is thus inductively coupled to the coil. The antenna picks up the signal applied to the coil and transmits it to a receiver which is typically positioned in the operator's cab. The receiver demodulates the detected signal and displays on an indicator in the receiver a weight corresponding to the weight represented by the received signal.

The dynamometer utilized here is an especially simple, yet accurate and rugged device. It comprises a pair of spaced freely rotatable guide pulleys for guiding the cable and an intermediate freely rotatable roller mounted on a cantilever bar to sense tension in the cable and thereby sense the weight of the load being lifted by the cable. In particular, the cantilever bar forms the axle for the intermediate roller. It is affixed to a base plate which also mounts the guide pulleys. A pair of strain gage transducers mounted at the point of maximum linear strain of the bar sense the deflection of the bar in response to forces transmitted through the roller from the cable; this deflection is directly and linearly proportional to the weight of the load being lifted by the cable over a broad range of loads.

The output of the strain gage transducers is a voltage whose magnitude thus varies in direct proportion to the weight of the load being lifted. This output is applied to a voltage-to-frequency converter comprising a voltage-controlled oscillator in a servo loop including an integrating amplifier. The oscillator is set to operate at a selected center frequency in the absence of a load on the cable. In response to an applied load, an integrating amplifier charges up and drives the oscillator to a new frequency whose deviation from the center frequency is proportional to the weight of the load. A simple frequency-to-voltage converter feeds back the output of the oscillator as a balancing input to the integrator, so that the integrator holds the oscillator at the new frequency as long as the same load is detected by the strain gages. An advantage of this circuit is that the no-load frequency will deviate substantially from its nominal value if a strain gage transducer either opens up or shorts out, and thus a continuous check on the proper operation of this part of the system is provided.

The transducers and the voltage-to-frequency converter are connected in what is known as a ratiometric configuration, that is, the transducers form a first pair of arms of a bridge circuit and the voltage-to-frequency converter forms a second pair of arms of the bridge, with both being driven from the same power supply. With this arrangement, the converter frequency supplied as output is independent of variations of the power supply voltage.

At the receiver, the signal picked up from the receiving antenna is amplified, amplitude limited, and then applied to a phase-locked loop which synchronizes a local oscillator to the incoming signal frequency. In one embodiment of the invention, the driving voltage applied to the voltage controlled oscillator in the loop is a direct current voltage whose magnitude is proportional to the frequency of the oscillator. A direct current reference voltage is also provided by the phase-locked loop; the magnitude of the reference voltage is directly proportional to the center frequency of the local oscillator. These two voltages are amplified and their difference applied to an indicator meter through a variable gain amplifier. Provision is made for adjusting the indicated reading in accordance with the number of "parts of line" which are used on the cable tackle.

In an alternative embodiment of the invention, the output of the phase-locked loop is the output of the voltage controlled oscillator itself. This signal is applied first to a frequency divider and then to one input of an up-down counter. The output of a local oscillator set at the nominal center frequency is applied to the other input of the counter. The counter thus generates a count which is proportional to the deviation of the measured signal frequency from the center frequency and is thus proportional to the weight of the load being lifted. This count may be directly displayed on a digital read-out.

DETAILED DESCRIPTION OF THE INVENTION

The foregoing and other and further objects and features of the invention will be more readily apparent from the following detailed description of the invention when taken in conjunction with the accompanying drawings in which:

FIG. 4 is a block and line diagram of a transmitter in accordance with the present invention;

FIG. 5 is a block and line diagram of a receiver in accordance with the present invention; and FIG. 5A is a block diagram of an alternative form of readout for the receiver of FIG. 5.

Figure 1:
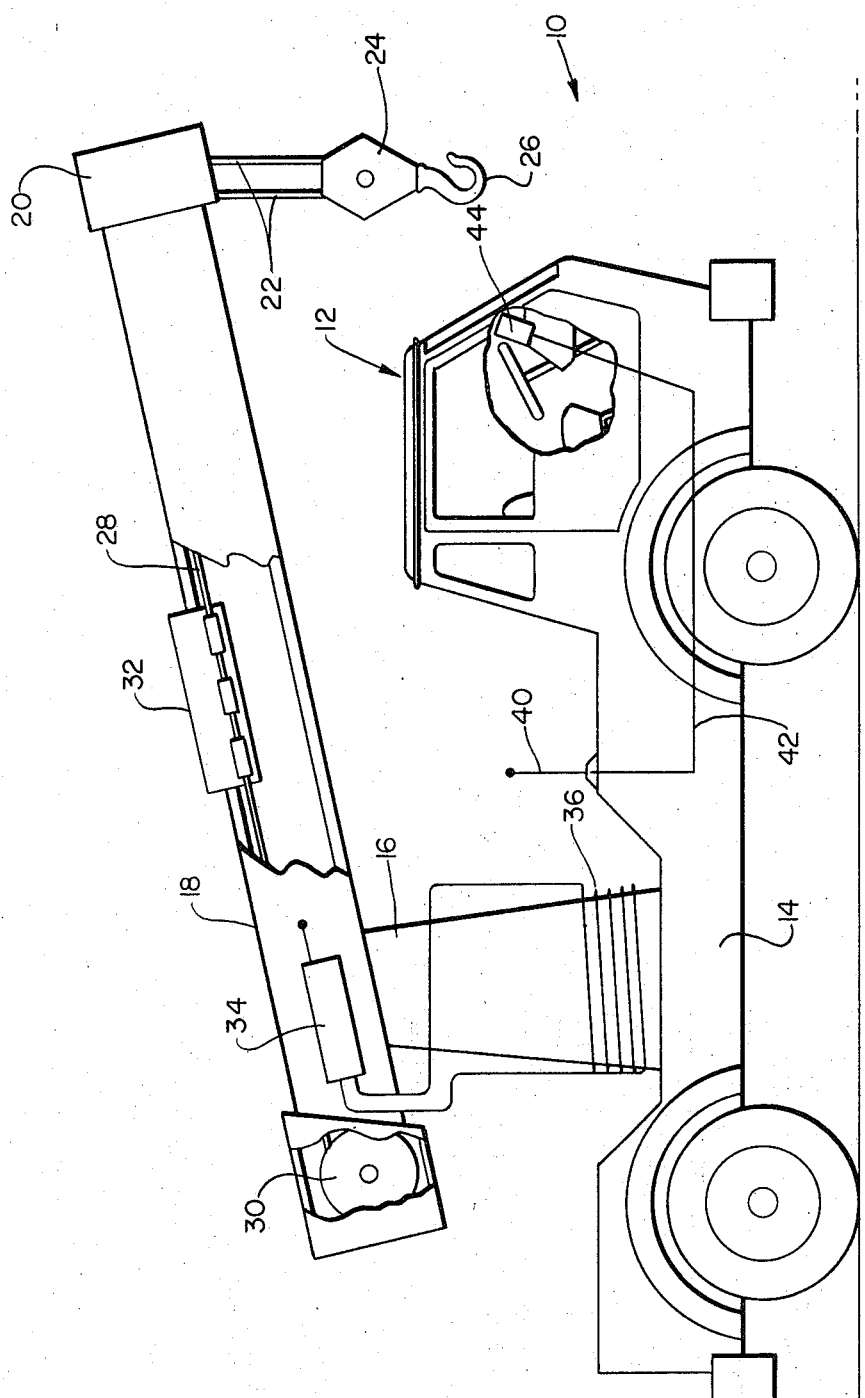
FIG. 1 is a sketch of a crane having a freely rotatable boom and incorporating the load weighing system of the present invention.

In FIG. 1, a crane has a cab 12 mounted on a stationary body 14. A pedestal 16 carries a boom 18 which is rotatably mounted on the body 14 for rotation about a vertical axis. The boom 18 has a head 20 carrying the usual pulleys (not shown) which lift a weight through cables 22, block 24 and a hook 26. A main lifting cable 28 passes down through the boom 18 to a drum 30 on which the cable 27 is wound.

The cable 28 passes through a dynamometer 32 which senses the tension in the cable to provide an indication of the load being lifted by the hook 26. As will be further described in connection with FIG. 4, the output of the dynamometer 32 is a voltage whose magnitude varies with the weight of the load being lifted. This voltage is applied to a transmitter 34 which is also mounted on the boom 18. The transmitter 34 energizes a coil 36 which is physically connected to the transmitter and which is wound around the pedestal 16. As the pedestal 16 rotates with respect to the body 14, the coil 36 remains stationary with respect to the pedestal but rotates with respect to the body.

An antenna 40 is positioned on the body 14 adjacent the coil 36 but spaced from it by an amount sufficient to provide rotational clearance between the antenna and the coil. The antenna is inductively coupled to the coil 36, that is, it is positioned in the near field of radiation of the coil. The near field of the coil extends to a distance which is a fraction of a wave length corresponding to the frequency at which the coil is being driven. For example, at a frequency of 50 kHz, the near field extends to within several hundred meters of the coil.

The signal picked up by the antenna 40 is coupled through a cable 42 to a receiver 44 mounted in the cab 12 of the crane. This receiver, which will be described in detail in connection with FIGS. 5 and 5A, contains an indicator which provides a direct indication of the weight of the load applied to the hook 26. Thus, the operator is apprised at all times of the weight of the load being lifted by the crane and therefore can operate the crane within safe operating limits.

Figure 2:
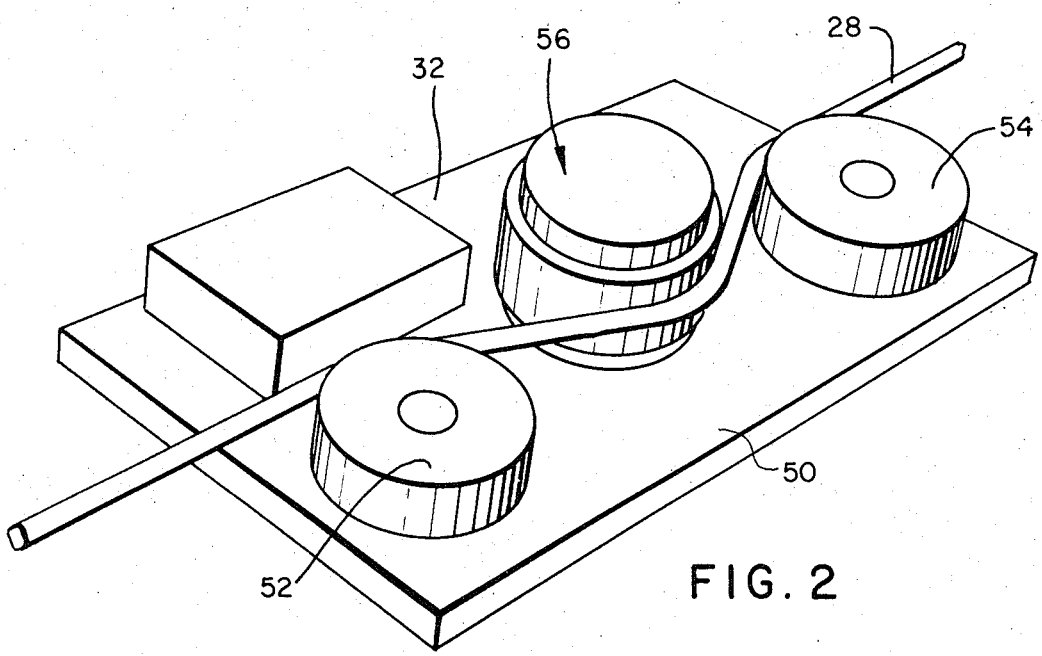
FIG. 2 is an enlarged view, in perspective, of a dynamometer in accordance with the present invention

The dynamometer 32 is shown in greater detail in FIG. 2. It consists of a base plate 50 on which are mounted spaced freely rotatable guide pulleys 52 and 54, respectively, and an intermediate freely rotatable load cell assembly 56 offset a slight amount from a line joining the centers of the pulleys 52, 54. The main load lifting cable 28 passes between the assembly 56 and the pulleys 52 and 54, respectively. The pulleys 52 and 54 guide the cable 28 as it passes through the dynamometer. The load cell assembly 56, on the other hand, is positioned to apply a sideways thrust to the cable 28 and thus to receive an equal and opposite side thrust, i.e., perpendicular to its shaft axis, from the cable. AS long as the guide pulleys 52, 54 and the load cell assembly 56 do not deflect to any substantial degree under the load applied to the cable, the force applied by the cable to the assembly 56 is directly proportional to the load.

Figure 3:
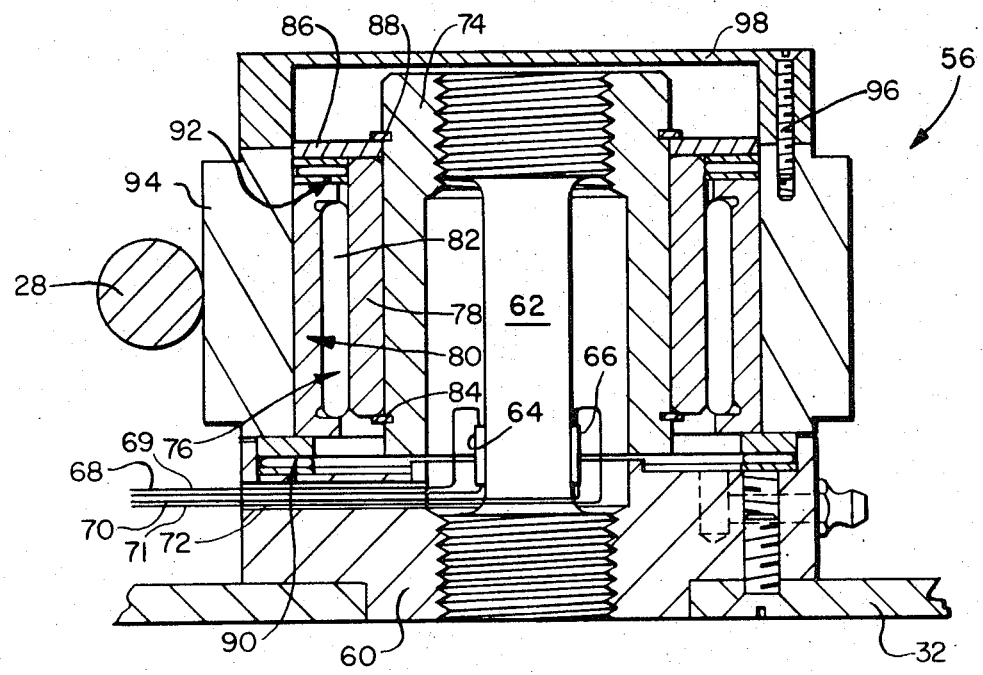
FIG. 3 is a vertical cross-sectional view along the lines 3—3 of FIG. 2.

The structure of the load cell assembly 56 is shown in detail in FIG. 3. A mounting block 60 is rigidly attached to the plate 32. Threaded into the mounting block is a bar 62 having strain gages 64 and 66 mounted on the uniform section just beyond the curved neck of the bar. This coincides with the area of maximum linear strain. Leads 68, 69, 70, 71 from the strain gages 64, 66, extend through a bore 72 in the mounting block 60. These leads connect the strain gages to the transmitter, as described in detail in connection with FIG. 4 below.

A cylindrical sleeve 74 is threaded onto the tensile bar 62 at the upper end thereof. A roller bearing 76 comprising a separable inner race 78 and an outer race and roller assembly 80 is fitted around the sleeve 74. The inner race 78 is held in place at its inner end by means of a retainer 84 which snaps into a corresponding groove in the sleeve 74. The race 78 is held in place at its outer end by means of a collar 86 and a retainer 88 which is disposed in a groove on the sleeve 74. Axial displacement of the outer race assembly 80 is limited by inner and outer thrust bearings 90 and 92, respectively, that bear against the block 60 and collar 86.

The base surfaces of roller 94 and outer race assembly 80 ride on the top surface of thrust bearing 90 which extends just beyond the top of mounting block 60 thus preventing contact between moving roller 94 and stationary block 60. A top cap 98 is attached to roller 94 by means of screws 96. The top cap provides physical protection for the strain gauge load cell as well as a reservoir for bearing lubricant.

Referring to FIGS. 2 and 3, the side force on the load cell assembly 56 is transmitted through roller 94, bearings 80 and 78, and sleeve 74 to bar 62. This bar behaves essentially as a uniform cross-section free-ended cantilever; its effective length is the flatted section between its threaded ends. It is "built-in" to block 60. As the side force increases and the beam deflects, it carries with it essentially rigid sleeve 74 and inner race 78. The deflecting action necessarily produces a slight elevation of the cable at the load cell assembly 56 with respect to pulleys 52 and 54. The elevation produces enough of a downward force by cable 28 on roller 94 to maintain the roller in its down position against thrust bearing 90. With outer race and bearing assembly 80 captive to roller 94, load cell deflection with increasing side force is accompanied by a "shearing" action between bearing rollers and inner race 78. The deflecting beam carries the inner race upward; the downward component of cable tension causes roller 94 and captive outer race 80 to stay down and pivot at thrust bearing 90. Clearly, the bearing used is of a separable inner race design freely able to displace axially in the presence of a thrust load.

Bearing 94 is preferably of hardened steel with a smooth outside diameter and no lips. This avoids any interaction between the moving spiral-wound wire rope and contacting projections (e.g. lips of a sheave) which would cause a cyclical variation in the direction of the force vector and thus an apparent cyclical variation in the magnitude of lifted load.

Bar 62 has flattened faces oriented normal to the applied force vector. Bending in the cantilever beam occurs such that tensile and compressive stress at the beam's outer fibers increase linearly with increasing force. Strain gages 64 and 66 are mounted on the beam flats at the base of the beam; maximum tensile and compressive strain levels are thus induced in the gages causing their resistance to be increased (tension) and decreased (compression) linearly with increasing load. When the gages are connected to a transmitter as shown in FIG. 4, bending is translated directly into a voltage which frequency modulates a carrier for transmission to the receiver.

In FIG. 4 the strain gages 64, 66 are represented as variable resistors connected electrically in series with each other between a reference potential (shown as ground) and a supply voltage, $E_1$. The junction of these gages is connected through a resistor 110 to an integrator 112 comprising a high gain difference amplifier 114 and a feedback capacitor 116. A "zero point" reference potential is derived from the source $E_1$ through resistors 118 and 120 and potentiometer 122; it is applied as a further input to the integrator 112 through an averaging circuit 123 consisting of a resistor 124 and a capacitor 126.

The output of the integrator 112 is applied to a voltage controlled oscillator 128 through resistors 130 and 132. The oscillator 128 is formed from a unijunction transistor 134, a capacitor 136, supply resistors 138 and 140, and output resistor 142. The output of the oscillator 128 is applied to a monostable multi-vibrator 144 (also known is a "one shot"). Multivibrator 144 has a pair of output 1 leads 144a and 144b. In the absence of a pulse from oscillator 128, the output on lead 144a is "low." In response to a pulse from oscillator 128, the output on lead 144a goes "high" for a precisely defined period of time and then reverts to its normal ("low") state. The output on lead 144b is just the complement of this.

The output on lead 144a is applied to the coil 36; the output on lead 144b is applied to a phase splitter 146 in the form of a transistor 150, resistors 152 and 154, and a "push-pull" transistor stage in the form of transistors 156 and 160 and a current-limiting resistor 158. A resistor 162 connects the phase splitter 146 to the common potential source $E_1$. A variable resistor 164 connects the output of the phase splitter 146 to the averager 123. When the output on lead 144b of one-shot 144 is low, transistors 150 and 156 are "off" and the voltage at the collector of transistor 156 is applied to the averager 123. When the output of phase splitter 144b is "high", transistors 150 and 156 are "on" and the voltage at the collector of transistor 156 is very nearly at ground potential. Since the multivibrator 144 provides an output pulse of fixed duration each time it is triggered by the oscillator 128, the average voltage applied to the averaging circuit 123 is linearly related to the frequency of the oscillator. The voltage across the capacitor 126 is thus also linearly related to the oscillator frequency.

The oscillator 128 has a frequency $f_0$ determined by the voltage $E_1$ and the output voltage of the integrator 112, as well as the time constants involving charging of the capacitor 136. When the charge on the capacitor 136 reaches a certain level, the transistor 134 breaks down and generates a pulse across the resistor 142 which triggers the multivibrator 144 as described above. If the loads used by the strain gages 64 and 66 increases, the voltage from junction 65 applied to the inverting input of amplifier 114 decreases and the output voltage of the integrator 112 therefore begins to increase. This increases the charging rate of the capacitor 136 and thereby increases the frequency of the oscillator 128, which frequency is transmitted through the coil 36.

The increase in oscillator frequency results in an increase in the voltage across the capacitor 126, applied to the non-inverting input of amplifier 114. When the oscillator frequency reaches a value such that the voltage of capacitor 126 equals the junction 65 voltage, the integrator 112 output ceases to charge, thereby holding the frequency at that value.

If the sensed load decreases, the opposite sequence follows and the oscillator frequency decreases. In each case the integrator 112 holds the oscillator at a frequency corresponding to the sensed load and the frequency is substantially linearly related to the sensed load.

Calibration of the transmitter output is accomplished by adjusting the variable resistors 122 and 164 to set the no-load oscillator frequency (zero point) to a predetermined value $f_0$ and the constant of proportionality relating frequency to load (span) to a predetermined value.

The averaging circuit 123 in conjunction with the phase splitter 146 form a frequency to voltage converter whose output is directly related to the frequency of a signal applied as input to the phase splitter from the multivibrator 144. The converter forms part of what is effectively a bridge circuit, the strain gages 64, 66 forming a first pair of arms of the bridge and the phase splitter 146 and averaging circuit 143 forming the equivalent of a second pair of arms of the bridge.

Since the output of each arm pair is effectively balanced against each other by virture of the rebalance arrangement, and since each arm pair is driven from the same potential source $E_1$, variations in this source potential have no effect on the bridge output and thus the oscillator frequency is insensitive to power supply variations.

Turning now to FIG. 5, the signal picked up from coil 36 by antenna 40 is applied to bandpass filter 180 and thence to an amplifier 182 via resistors 184 and 186. A feedback resistor 188 is connected around this amplifier. The output of the amplifier is applied through a capacitor 190 and a resistor 192 to a voltage limiter 194 comprising a pair of diodes connected in reverse parallel. The output of the limiter 194 is in turn applied through a resistor 196 and a capacitor 198 to a phase-locked loop 200. A reference voltage $E_2$ is also applied to the loop 200 through resistors 202, 204 and 206. This same reference voltage is also supplied to the inverting input of amplifier 182. A low-pass filter comprising resistor 208 and capacitor 210 is also connected to this input.

Th phase-locked loop 200 includes a voltage-controlled oscillator 212, a phase detector 214, a low-pass filter 216 and an amplifier 218. The amplifier 218 provides as outputs two direct current voltages whose magnitudes are proportional, respectively, to the instaneous frequency of the oscillator 212 and to a reference frequency of this oscillator corresponding to zero load. The oscillator is adjusted so that its "zero load" frequency equals the center frequency of the transmitter oscillator 128. The first of the outputs of amplifier 218 is applied to the control terminal of the oscillator 212 and also to an amplifier 220 by way of voltage divider resistors 222 and 224. The second of the outputs of amplifier 218 is applied to an amplifier 226 by way of resistors 228 and 230 and a potentiometer 232. The inverting input terminal of each is cross coupled to the other by resistor 238.

The outputs of amplifiers 220 and 226 are applied to an amplifier 242 as shown. A set of scale factor resistors 244 are connected by a switch 246 for negative feedback around the amplifier. The switch 246 alters the amplifier gain to correspond with the "parts of line" used in the load lifting tackle. A double-pole double throw switch 250 having a normally open arm 250a and a normally closed arm 250b is operable to connect a predetermined one of the resistors 244 around the amplifier 242 for calibration purposes. A corresponding double pole, double throw switch 252 having normally open arms 252a and 252b connects a resistor 254 across an input resistor 256, when closed; it also connects a resistor 258 across an additional input resistor 260. The switch is used for calibration as described below.

A meter 270 is connected in series with resistors 272 and 274 between the outputs of amplifiers 226 and 242. By virtue of its connection in this manner, it effectively responds to the difference between the inputs applied to amplifiers 220 and 226 while allowing adjustment via amplifier 242 of the difference signal for the number of "parts of line" in the system.

In operation, the antenna 40 (FIG. 1) detects signals applied to the coil 36 by the transmitter (FIG. 4). After these signals pass through the bandpass filter 180, they are amplified in amplifier 182, limited in limiter 194, and thence applied to phase locked loop 200. The loop 200 is commercially available as a single package. For purposes of illustration, I have depicted a loop sold commercially by Signetics Corporation under the designation SE/NE 565. This unit operates in the conventional manner, that is, it compares the phase and frequency of a local voltage controlled oscillator with that of a signal applied to it and changes the frequency of the local oscillator until it is locked in phase and frequency to the incoming signal.

At this point, the amplifier 218 provides as outputs direct current voltages which are proportional to the frequency of the signal applied to the loop 200 and to the reference frequency of the oscillator 212, respectively. The difference between these voltages thus represents the deviation from the reference frequency and therefore is proportional to the weight of the load being lifted. The meter 270 responds to this difference as noted above and thus provides a direct indication of the weight of the load.

The receiver can be calibrated for both zero and full scale without any load on the load line 32. This is accomplished by means of the potentiometer 232 and the resistors 244. With switches 250 and 252 open and oscillator 212 operating at its reference frequency, potentiometer 232 is adjusted to provide zero meter deflection. The switches 250 and 252 are then closed to set the gain of amplifier 242 to a predetermined value corresponding to a full load. The variable resistor 272 is then adjusted to cause full scale deflection of meter 270. The zero point is then rechecked and reset if necessary. Meter 270 is thus calibrated for both zero and full scale.

The receiver illustrated in FIG. 5 provides an analog read-out. The read-out portion is inexpensive to manufacture and yet is reliable and accurate. However, a digital read-out may sometimes be desired for greater ease in reading the load. A simple, yet effective digital read-out for such a purpose is shown in FIG. 5A. Only the phase-locked loop and those portions following it are shown in FIG. 5A; the portions preceding it are identical to those in FIG. 5 and will not be further described. To obtain a digital read-out, the output of the phaselocked loop 200 is taken from the output of the voltage controlled oscillator 212 instead of from the amplifier 218. As previously noted, the frequeny of this output is indicative of the weight of the load being lifted. This signal is applied to the "up" input of an up-down counter 282 through an AND gate 284.

The counter 282 has a counting section 282a, a divider section 282b, and a display section 282c. An oscillator 286, which is set to oscillate at the no-load frequency, $f_0$, of the voltage controlled oscillator 212 of loop 200, is connected to the "down" input of the counter 282 through an AND gate 290. The gates 284 and 290 are energized for a fixed period of time from a timer 292.

The counting section 282a of counter 282 generates a count indicative of the difference between the frequencies of the pulses applied to it during the counting interval and thus indicative of the load being lifted by the crane. The divider section 282b divides this count by a factor related to the parts of line being used and applies the resultant count to the display section 282c which displays the load directly. Timer 292, which may simply comprise a multivibrator providing alternate high-level and low-level pulses of stable duration, in addition to controlling the counting interval for gates 284 and 290, also controls the display interval for counter 292. At the end of the display interval, it resets the counter 282.

When no load is being lifted by the crane, the frequency of the oscillators 212 and 286 is the same and thus the net content of the counter 282 is zero. When, however, a load is being lifted, the frequency of the oscillator 212 is greater than the frequency of the oscillator 286 and tus a net reading accumulates in the counter 282. This reading is a direct indication of the load weight.

From the foregoing it will seem that I have provided an improved load weighing system for cranes. The system uses antennas which are essentially inductively coupled to each other and thus accommodates itself to cranes having freely rotatable booms with the weight sensor positioned on the boom and the weight indicator positioned in a stationary operator's cab. The system is accurate, simple to use, and is insensitive to stray electrical radiation and other noise sources.

Further, it will be seen that I have provided an improved dynamometer for use in crane load weighing systems. The dynamometer is sturdy, yet accurate, and is readily mounted o a crane. It provides a reliable indication of the weight of the load being lifted by the main cable.

It will be understood that the foregoing description is illustrative only and is not to be taken in a limiting sense, the scope of the invention being defined in the claims.

I claim:

1. A load weighing system for a crane having a boom continuously rotatable about a fixed pedestal on the crane body, comprising:
   A. signal generating means for mounting said boom to generate a load signal indicative of the weight of a load lifted by said boom,
   B. boom antenna means for mounting on said boom to form an antenna coil encircling said pedestal,
   C. means responsive to said load signal for electrically energizing said boom antenna means with a signal indicative of said load signal,
   D. a body antenna for mounting adjacent said pedestal on said body and inductively coupled to said coil to receive signals therefrom,
   E. a receiver for mounting on said body and connected to receive signals from said body antenna, and
   F. an indicator for mounting on said body and connected to said receiver for displaying an indication of the weight of the load in response to signals received by said body antenna.

2. A load weighing system according to claim 1 in which said energizing means comprises a transmitter mounted on said boom which emits a signal indicative of the load signal and in which said loop comprises a multi-turn electrically conductive wire connected to said transmitter.

3. A load weighing system according to claim 2 in which said load signal generating means includes a strain gage transducer having a tensile bar mounted to sense the tension in a cable supporting said load.

4. A load weighing system according to claim 3 in which said load signal generating means comprises a dynamometer having a pair of outer pulleys freely rotating about parallel spaced axes and guiding said cable and an inner pulley freely rotating about an axis parallel to said inner pulley axes, axially offset thereform, having said tensile bar forming the hub thereof, and pressing against said cable.

5. A load weighing system according to claim 4 in which said tensile bar is supported on a mounting plate in cantilever manner and has a plurality of strain gages mounted thereon for sensing strain in said bar due to pulley deflection caused by said load.

6. A load weighing system according to claim 5 in which said energizing means includes a voltage controlled oscillator whose frequency varies in accordance with the load sensed by said dynamometer, the output of said oscillator being applied to said loop.

7. A load weighing system according to claim 6 in which said receiver includes a phase lock loop providing an output indicative of the frequency variation of signals detected in said body antenna.

8. For a crane having a cable for lifting a load, the improvement comprising a load weighting system having:
   A. means for sensing tension in the cable to thereby provide a signal indicative of the weight of said load
   B. a transmitter providing an output whose frequency varies in response to said signal,
   C. a receiver remote from said transmitter and responsive to the frequency of signals received therefrom to provide an output indicative of the weight of said load, and
   D. inductively coupled antennas connected respectively to the transmitter and to the receiver for coupling the transmitter output to said receiver.

9. A crane load weighing system according to claim 8 in which said transmitter comprises:
   A. an oscillator whose frequency varies in response to inputs applied thereto,
   B. an integrator having applied as inputs thereto:
      1. a first input derived from said sensing means and indicative of the weight of said load, and
      2. a second input derived from said oscillator and indicative of the oscillator frequency, providing as output the integral of the difference of said inputs, and
   C. means connecting said integrator output as input to said oscillator.

10. A crane load weighing system according to claim 9 in which said tension sensing means includes a plurality of strain gages responsive to said cable tension and connected to provide said first input to said integrator.

11. A crane load weighing system according to claim 9 in which said sensing means includes first and second series connected strain gages having a reference potential applied thereto and providing an output at a common connection point for application to said integrator as said first input.

12. A crane load weighing system according to claim 9 which includes a frequency to voltage converter for generating said second input, said converter comprising:
   A. a potential source
   B. an integrator, and
   C. switching means operable to alternately connect said source to said integrator and disconnect it therefrom in response to the output of said oscillator.

13. A crane load weighing system according to claim 12 in which the reference potential applied to the strain gages is obtained from the potential source included in said frequency to voltage converter.

14. A crane load weighing system according to claim 8 in which said receiver includes:
   A. means for generating a direct current signal whose magnitude is proportional to the difference between the transmitter output frequency and a local reference frequency corresponding to a no-load condition
   B. an amplifier whose gain is settable in accordance with the parts of line of said cable,
   C. means connecting said direct current signal as input to said amplifier, and
   D. an indicator connected to receive the output of said amplifier.

15. A crane load weighing system according to claim 14 which includes switching means actuable to establish a predetermined gain for said settable gain amplifier to establish a defined output in the absence of an actual load.

16. A crane load weighing system according to claim 14 in which the direct current signal connecting means includes means for generating a direct current reference signal corresponding to said reference frequency and which further includes a second amplifier to which said direct current reference signal is applied as an input, said indicator being connected in series with the outputs of both said settable gain amplifier and said second amplifier to thereby provide an output indicative of the difference between said direct current signal and said direct current reference signal.

17. A crane load weighing system according to claim 16 which further includes a potentiometer interposed between said direct current reference signal generating means and said second amplifier such that only a selected portion of said reference signal is applied to said amplifier.

18. A crane load weighing system according to claim 16 which includes:
   A. an amplifier for amplifying the signal applied to the receiver,
   B. a limiter connected to limit the output of said amplifier to within predetermined limits, and
   C. means connecting the output of said limiter to said direct current signal connecting means.

19. A crane load weighing system according to claim 18 in which said crane has a load-lifting boom carrying said cable and mounted for unrestricted rotation about a pedestal on a carrier body, and in which
   A. said transmitter is mounted on said boom,
   B. said receiver is mounted on said carrier body, and
   C. said coupling means comprises
      1. a coil energized by said transmitter and looped around said pedestal for rotation there-around with said boom, and
      2. a stationary receiving antenn, fixed to said carrier body adjacent said coil and inductively couple thereto, said antenna applying to said receiver signals transmitted from said transmitter through said coil.

20. A crane load weighing system according to claim 8 in which said cable tension sensing means comprises a dynamometer having
   A. a base plate for mounting adjacent a portion of said cable,
   B. first second and third rotating pulleys mounted on said base plate for rotating contact with said cable, in a common plane of contact, and having axes of rotation perpendicular to said plate,
   C. said third pulley being positioned intermediate said first and second pulleys with its rotational axis offset from a line joining the rotational axis of said first and second pulleys and being mounted on a shaft cantilevered from said plate and having strain gages thereon for sensing strain in said shaft caused by tension transmitted to the shaft through said pulley from the cable.

* * * * *

UNITED STATES PATENT OFFICE
CERTIFICATE OF CORRECTION

Patent No. 3,826,321     Dated July 30, 1974

Inventor(s) Edward T. Rigney et al.

It is certified that error appears in the above-identified patent and that said Letters Patent are hereby corrected as shown below:

Claim 1, line 4, insert -- on --, before "said".

Claim 19, line 11, "antenn" should read -- antenna --.

Column 9, line 12, "tus" should read -- thus --.

Signed and sealed this 22nd day of October 1974.

(SEAL)
Attest:

McCOY M. GIBSON JR.
Attesting Officer

C. MARSHALL DANN
Commissioner of Patents